March 4, 1969  F. X. BROWN ET AL  3,430,323
WELDING METHOD

Filed July 12, 1965  Sheet 1 of 2

INVENTORS
Francis X. Brown and
Samuel W. Wismer Jr.
BY

United States Patent Office 3,430,323
Patented Mar. 4, 1969

3,430,323
WELDING METHOD
Francis X. Brown, Broomall, and Samuel W. Wismer, Jr., Springfield, Pa., assignors to Westinghouse Electric Corporation, Pittsburgh, Pa., a corporation of Pennsylvania
Filed July 12, 1965, Ser. No. 471,121
U.S. Cl. 29—157.3                               9 Claims
Int. Cl. B21d 53/02; B21k 29/00; B23p 15/26

ABSTRACT OF THE DISCLOSURE

A method of joining a disc-like member at its periphery to an open-ended shell structure by explosive welding. The explosive material is formed as an annular band and in a manner to effect a detonation wave that is propagated toward the annular end of the shell.

---

This invention relates to autogenous welding, more particularly to explosive welding, and has for an object to provide an improved autogenously welded structure and method of explosion welding said structure.

Another object of the invention is to provide an explosive welding method for autogenously joining a disc-like member at its periphery to an open-ended shell structure by explosion welding.

The invention is primarily, though not solely, directed to the manufacture of relatively large heat exchangers of the tube and shell type and has for a further object to provide an explosion welding method for autogenously joining a tube sheet of a heat exchanger to the shell structure.

Briefly, in accordance with the invention, a disc-like plate member (for example a tube sheet of a heat exchanger) is provided with a peripheral recess of slightly less diameter than the internal diameter of the open end portion of a mating shell structure (for example, a tubular shell or a channel head of a heat exchanger) and the open end portion is positioned in concentric encompassing relation with the recess. The end face of the shell structure and the recess are so formed that an annular V-shaped space is preliminarily attained.

An annular band of explosive material is snugly wrapped about the outer periphery of the shell structure adjacent the end portion and detonated to effect welding of the shell structure to the plate member by the force of the explosion. The explosive material may be of any suitable type having a detonation velocity greater than the sonic velocity of the metal to be welded, as known in the art, and so shaped and detonated that the detonation wave is propagated in a manner to obtain autogenous welding in a predetermined manner.

To obtain an annular weld along the circumferential interface of the shell structure and the plate member, in accordance with one aspect of the invention, the band of explosive material is formed with a uniform cross section and detonated at one (at least) point along its periphery. The resulting detonation wave thus travels in opposite circumferential directions to effect the weld. Some elongation of the shell metal in a direction normal to the direction of the detonation wave is attained and results in at least partial closing of the V-shaped space.

To provide the required forces for closing the V-shaped space and welding the adjacent surfaces, the band of explosive material is formed and detonated in a manner to provide a detonation wave front directed towards the V-shaped space, in accordance with another aspect of the invention.

The above and the objects are effected by the invention as will be apparent from the following description and claims taken in connection with the accompanying drawings, forming a part of this application, in which:

Figure 1:
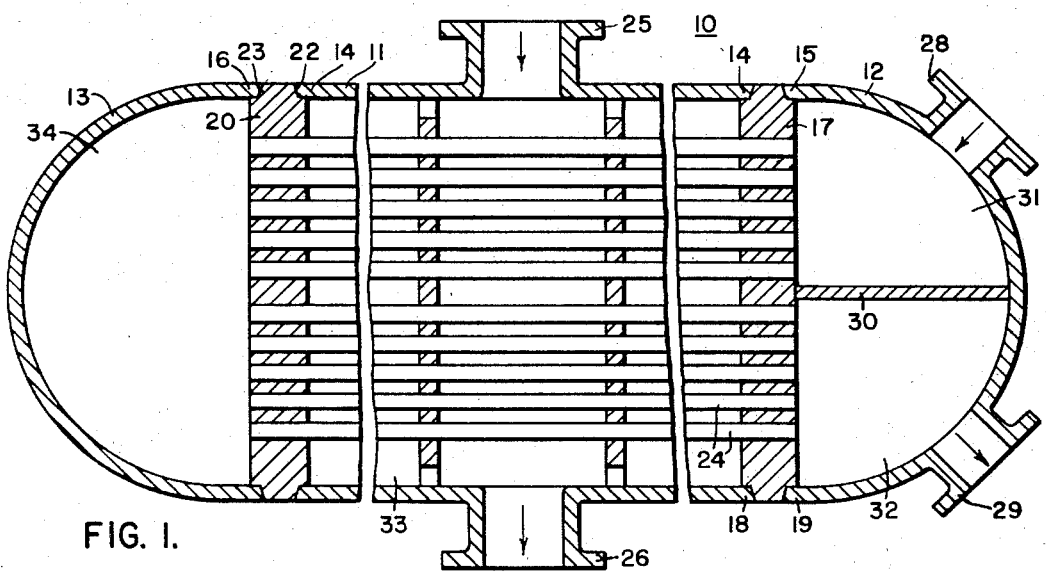
FIGURE 1 is an axial sectional view of a tube and shell heat exchanger welded in accordance with the invention.

Referring to the drawings in detail, in FIG. 1 there is shown a heat exchanger structure, generally designated 10, comprising a tubular casing structure including a tubular main body or shell portion 11 and a pair of opposed channel head members 12 and 13 of any suitable form such as hemispherical. The tubular body portion 11 and the head members 12 and 13 are each provided with open ends defined by annular end portions 14, 15 and 16, respectively. A partition plate or member 17 of disc-like shape, hereinafter termed a tube sheet, is welded to the end portions 14 and 15 by annular autogenous weld joints 18 and 19 and, in a similar manner, a second partition or tube sheet 20 is welded to the end portions 14 and 16 by annular autogenous weld joints 22 and 23, by a method in accordance with the invention and subsequently to be described in detail.

As well known in the art, the heat exchanger 10 further comprises a bundle of open-ended elongated tubes 24 disposed within the tubular body member 11 and supported at their opposite ends by the tube sheets 17 and 20. The body member 11 is provided with an inlet fitting 25 and an outlet fitting 26 and, in a similar manner, the head member 12 is provided with an inlet fitting 28 and an outlet fitting 29. An internal wall member 30 together with the tube sheet 17 divides the channel head 12 into compartments 31 and 32. The body member 11, together with the tube sheets 17 and 20, defines a central compartment 33, while the tube sheet 20 and the channel head 13 define an end compartment 34.

The heat exchanger operates in a conventional manner to transfer heat from one fluid to another. Briefly, a first pressurized fluid is admitted thereto through the inlet fitting 28 and a second pressurized fluid at a different temperature is admitted thereto through the inlet fitting 25. The fluid admitted through the fitting 28 to the end compartment 31 is directed through the upper bank of the tube bundle 24 to the other end compartment 34 and returned to the lower compartment 32 through the lower bank of the tube bundle 24, and is then directed therefrom through the outlet fitting 29.

Concomitantly therewith, the fluid admitted by the inlet fitting 25 into the central compartment 33 flows past and around the tube bundle 24, with resulting heat exchange between the two fluids by surface contact, and thence directed outwardly through the outlet fitting 26.

In view of the above, it will now be apparent that the quality and strength of the weld joints 18, 19, 22 and 23 must be of a high order for reliability and long service without leakage.

The method of explosively forming the weld joints 22, 23, 18 and 19 may be substantially similar, accordingly the preparation for weldment and the welding of the joint 22 will be primarily described.

Figures 2, 3:
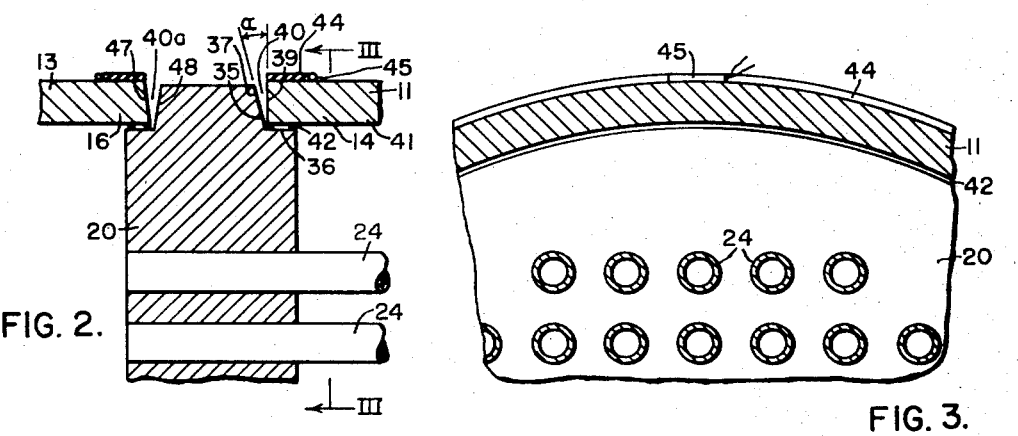
FIG. 2 is an enlarged fragmentary sectional view of the tube sheet and shell structure of the heat exchanger shown in FIG. 1 prior to welding in accordance with one aspect of the invention.
FIG. 3 is a transverse view taken on line III—III of FIG. 2.

Referring to FIG. 2, the tube sheet 20 is provided with a circumferential recess 35 having an annular cylindrical surface portion 36 concentric with the central axis of the tube sheet and an annular end surface portion 37 of frusto-conical shape and inclined at an angle of more than 90° with the surface 36. The end portion 14 of the shell structure 11 is provided with an annular end surface portion 39 disposed perpendicularly to the central longitudinal axis of the shell structure 11. Hence, the end surfaces 37 and 39 jointly define a V-shaped space 40. The included angle α is so selected that the width of the space 40 at its outermost portion is preferably about 25% of the thickness of the casing 11. For example, if the casing 11 is about 1" thick, the space 40 is preferably about ¼".

The cylindrical surface 36 has a diameter that is slightly smaller than the diameter of the shell structure's inner surface 41, preferably about ⅛".

To prepare the structure for welding, one or more convolutions of wire 42 are wrapped about the surface 36 and then the shell structure 11 is placed in encompassing relation therewith, as illustrated. The thickness of the wire 42 is about one half the difference in the two diameters or about 1/16" and is employed to maintain the shell surface 41 and the surface 36 in closely spaced concentric relation with each other.

An explosive charge, shaped as an annular band 44 of explosive material having a width of about, or slightly greater than, the width of the surface 36 is snugly wrapped about the end portion 14 and a suitable electrically actuated detonating device 45 is attached to the outer surface of the shell structure 11 in abutment with or at least in close proximity to, the explosive band 44.

The band 44 may comprise any suitable explosive material, with a suitable filler agent, and having a detonation velocity at least as great as sonic velocity in the metal employed in the tube sheet 20 and shell 11 having the higher sonic velocity. For example the explosive material may be of the types known as TNT, PETN, or other suitable explosive. These materials are well known in the art and need not be further described. However, PETN is preferred since it may be mixed with a rubber-like filler and formed in a thin sheet of rubbery, elastic texture and flexible, and is of a highly reliable and safe nature, suitable for manufacturing use.

The explosive charge 44 is fired by detonating the detonator 45 and two resulting detonation waves are propagated in opposite circumferential directions about the shell structure 11. The force of the circumferential detonation waves have two primary components of force, one directed radially inwardly towards the surface 36 of the recess and the other directed axially towards the end face 37 of the recess. The radial component of force is effective to translate or elongate the shell end portion 14 at a sufficiently high rate of acceleration to cause autogenous welding of the end portion 14 to the surface 36 of the recess by impingement, as illustrated at 22a in FIG. 4. The axial component of force is effective to elongate the shell end portion 14 at a sufficient rate of acceleration to effect at least partial closure of the V-shaped space 40 and partial autogenous welding of the end face 39 of the shell structure to the end face 37 of the recess, as illustrated at 22b.

Figure 4:
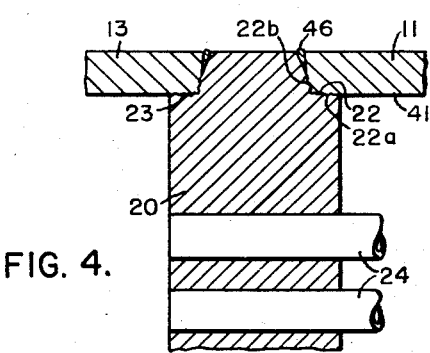
FIG. 4 is a view similar to FIG. 2, but illustrating the structure after welding.

Accordingly, by referring to FIG. 4, it will be seen that the weld joint 22 attained with the above method comprises the first portion 22a disposed at the interface between the surfaces 36 and 41 (FIG. 2) and the second portion 22b disposed at the resulting interface between the end faces 37 and 39 (FIG. 2).

In the event that the V-shaped space 40 is not fully closed by the axial component of the detonation forces, an annular fillet 46 of metal may be applied, if desired, by any suitable welding method. The fillet 46 is not required to augment the physical strength and leakproof properties of the weld joint 22 and is applied chiefly for cosmetic reasons.

The inclination of the end faces 37 and 39 to provide the V-shaped space 40 illustrated in FIG. 2 in connection with the weld joint 22 may be obtained in other ways. For example, as illustrated in FIG. 2 in connection with the weldment preparation for the weld joint 23 (FIG. 1), both of the end faces 47 and 48 may be of frusto-conical shape and inclined in a manner to provide a V-shaped space 40a of the same proportions as the V-shaped space 40.

As illustrated in FIG. 4, the weld joint 23 attained with the modified weldment preparation shown in FIG. 2 is substantially identical to the weld joint 22.

Figure 5:
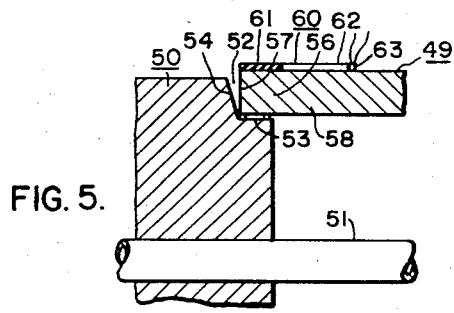
FIG. 5 is a view similar to FIG. 2, but illustrating the heat exchanger structure prior to welding in accordance with another aspect of the invention.
Figure 7:
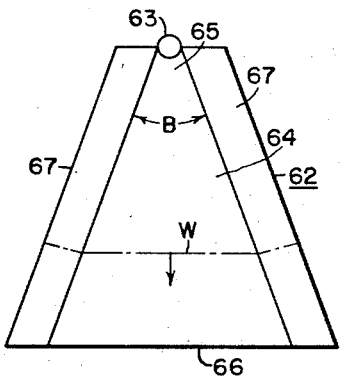
FIG. 7 is an enlarged view illustrating a portion of the charge shown in FIGS. 5 and 6.
Figure 6:
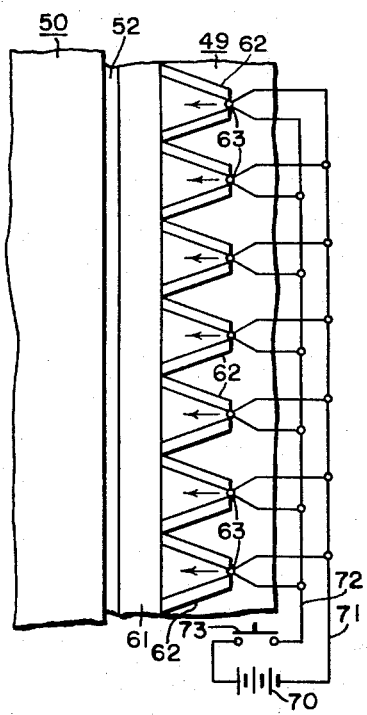
FIG. 6 is a developed plan view of FIG. 5 illustrating the shaped explosive charge.
Figure 8:
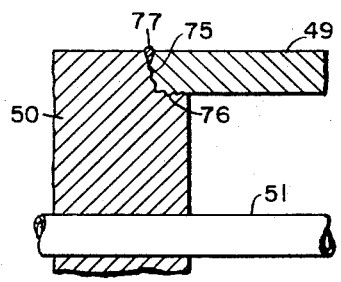
FIG. 8 is a view similar to FIG. 5, but illustrating the structure after welding.

FIGS. 5–7, inclusive, illustrate a preferred method of explosive welding in accordance with the invention, and FIG. 8 illustrates the welded joint attained thereby.

Referring to FIGS. 5 and 6, there is shown a fragmentary portion of a shell structure 49 and a tube sheet 50, respectively similar to the tube sheet 20 and the shell structure 11 illustrated in FIG. 1, and having a plurality of heat exchanger tubes 51 (only one shown) received in the tube sheet 50. Here again, the tube sheet 50 is provided with a peripheral recess 52 similar to the recess 35 and having an annular cylindrical surface portion 53 and an annular end surface portion 54 of frusto-conical shape, while the shell structure 11 has an end portion 56 disposed in registry with the recess 52. The end portion 56 of the shell structure has an annular end surface portion 57 forming a V-shaped space with the end surface 54 and an internal cylindrical wall portion 58 maintained in closely spaced relation with the surface 53 of the recess 52.

In this weldment preparation, there is provided an explosive charge 60 having an annular band portion 61 wrapped about the end portion 56 of the shell structure 49 and further including an annular array of plane wave detonation generators 62 disposed in endwise abutment with the band portion and provided with detonators 63.

The plane wave detonation generators 62 are substantially identical to each other and may be of any suitable type. As best shown in FIG. 7, they include a central portion 64 of isosceles triangular shape with a central apical portion 65 and a base portion 66, and a pair of lateral strip portions 67 of parallelogram shape extending from the apical portion 65 to the base portion 66.

The triangular portion 64 is formed of an explosive material having a detonation velocity $D_L$ while the strip portions 67 are formed of an explosive material having a relatively higher detonation velocity $D_H$. The plane wave detonation generators are so shaped and the explosive material detonation velocities $D_L$ and $D_H$ are so chosen that, when the associated detonator 63 is detonated, the resulting detonation wave is propagated toward the base 66 with its wave front W substantially parallel to the base 66. The formula for the central angle B is:

$$\text{angle } B = 2 \cos^{-1} D_L/D_H$$

Hence, if the detonation velocities $D_L$ and $D_H$ of the selected explosive materials are 8,000 feet per second and 26,000 feet per second, for example, by substitution in the above formula angle $B = 2 \cos^{-1} 8{,}000/26{,}000 = 2 \times \cos^{-1} .307$
angle $B = 2 \times 17.6°$ or $35.2°$ The detonators 63 are arranged to be fired in unison and, as indicated in FIG. 6, are electrically connected in parallel across a suitable power supply 70 by a pair of main conductors 71, 72 having a suitable switch 73 interposed therein to complete the electrical circuit.

Accordingly, to weld the shell structure 49 to the tube sheet 50, the switch 73 is depressed, thereby jointly initiating the detonators 63 and effecting detonation of the wave front generators 62. As the wave front generators are jointly detonated, the forces created by the detonation wave front W are directed, as indicated by the arrows in FIG. 6, toward the annular band of explosive material 61 with resulting peripheral detonation thereof. The major components of force created by the explosion of the band 61 are thus transverse to the periphery of the band and are directed toward the face 54 of the recess 52 with attendant rapid elongation of the metal in the end portion 56 and substantial closure of the V-shaped space and welding of the abutting surfaces 54 and 57 to provide the weld joint portion 75, as shown in FIG. 8. The minor components of the explosive force of the band are directed radially inwardly, as in conjunction with the arrangement shown in FIG. 2, to form the weld joint portion 76. In the event that the weld joint portion 75 does not entirely close the V-shaped space, a small annular fillet 77 of metal may be deposited by any suitable welding method to complete the closure in a cosmetically pleasing manner.

As well known in the art, explosive welding induces autogenous welding at the abutting interface between two members by a traveling pressure wave phenomenon and the resulting jointure defines (in cross section) a sawtooth or generally sine wave outline as indicated in FIGS. 4 and 8.

It will now be seen that the invention provides a method for forming a deep autogenous weld joint between a tubular member and a disc-shaped plate member, which weld joint is attained in a simple and highly expedient manner by the explosive forces of explosive material. The quantity of the charge and the detonation velocity of the explosive material is not deemed to be critical, but should be sufficient to translate or distend by deformation a portion of one member into high velocity abutment with the juxtaposed portion of the other member to be welded. Accordingly, as the physical size of the members to be joined is increased, the physical weight of the explosive charge is commensurately increased, and vice versa.

Although several weldment arrangements for practicing the inventive method have been disclosed, it will be seen that the invention is not so limited, but is susceptible of various other changes and modifications without departing from the spirit thereof.

We claim as our invention:

1. A method of autogenously welding a rigid disc-shaped plate to a shell structure having an open end portion of annular shape, comprising the steps of:

providing a peripheral recess of annular shape in said plate, placing the open end portion of said shell structure in closely spaced encompassing relation with said recess, forming the recess with an annular wall extending in radial direction, and forming the open end portion of the shell structure with an annular wall in such a manner that the two walls jointly define a V-shaped space, placing an annular band of explosive material about the end portion of said shell structure, and autogenously welding the end portion of said shell structure to said plate by detonating said explosive material.

2. The method recited in claim 1, and further including the step of:

placing at least one loop of wire about the peripheral recess to maintain the shell structure in closely spaced concentric relation with the recess before detonation of the explosive material.

3. A method of autogenously welding a rigid disc-shaped metal plate to a metal shell structure having an open end portion of annular shape, comprising the steps of:

providing in said plate a peripheral recess of annular shape having a cylindrical surface portion concentric with the central axis of the plate and an annular surface portion disposed transversely to the central axis of the plate, placing the open end portion of said shell structure in closely and concentrically spaced encompassing relation with the cylindrical surface portion of said recess, placing an annular band of flexible material that is explosive snugly about the end portion of said shell structure, and autogenously welding the end portion of said structure to at least one of the surface portions of said recess by detonating said explosive material.

4. The method recited in claim 3, and further including the steps of:

providing on the end portion of the shell structure an annular face inclined with the annular surface of the recess to jointly therewith define a V-shaped space therebetween before detonation, and autogenously welding the surfaces defining said V-shaped space by the explosive force of the detonated explosive material.

5. A method of autogenously welding a disc-shaped heat exchange tube sheet to a heat exchanger shell structure having an open end portion of annular shape, comprising the steps of:

providing a peripheral recess of annular shape in said tube sheet, placing the open end portion of said sheet structure in closely spaced encompassing relation with said recess, placing an annular band of explosive material about the end portion of said shell structure, and detonating said explosion material in a manner to effect a detonation wave propagated in a direction normal to and toward said tube sheet, thereby to autogenously weld the end portion of said shell structure to said tube sheet.

6. The method recited in claim 5, and further including the step of:

placing at least one loop of wire about the peripheral recess to maintain the shell structure in closely spaced concentric relation with the recess before detonation of the explosive material.

7. The method recited in claim 5, and further including the steps of:

forming the recess with an annular wall and forming the open end portion of the shell structure with an annular wall in such a manner that the two walls jointly define a V-shaped space therebetween before detonation, but are autogenously welded to each other by the explosive force of the explosive material after detonation thereof to provide an annular autogenous weld.

8. A method of autogenously welding a disc-shaped metal heat exchanger tube sheet to a metal heat exchanger shell structure having an open end portion of annular shape, comprising the steps of:

providing in said tube sheet a peripheral recess of annular shape having a cylindrical surface portion concentric with the central axis of the tube sheet and an annular surface portion disposed transversely to the central axis of the tube sheet, placing the open end portion of said shell structure in closely and concentrically spaced encompassing relation with the cylindrical surface portion of said recess, placing an annular band of flexible explosive material about the end portion of said sheet structure, and detonating said explosive material by an annular series of plane wave detonation generators in a manner to effect a detonation wave propagated toward said annular surface, and thereby autogenously weld the end portion of said structure to both of the surface portions of said recess.

9. The method recited in claim 8, and further including the steps of:
providing on the end portion of the shell structure an annular face inclined with the annular surface of the recess to jointly therewith define a V-shaped space therebetween before detonation, and
autogenously welding the surfaces defining said V-shaped space by high velocity translation of the face of the shell structure in a direction normal to and into abutment with the annular surface of the recess by the explosive force of the detonated explosive material.

References Cited

UNITED STATES PATENTS

| 1,881,160 | 10/1932 | Armacost | 29—482 |
| 3,197,856 | 8/1965 | Polhemus et al. | 29—497.5 X |
| 3,212,183 | 10/1965 | Burham et al. | 29—470.1 |
| 3,263,323 | 8/1966 | Maher et al. | 29—497.5 X |
| 3,292,253 | 12/1966 | Rössner et al. | 29—497.5 X |

JOHN F. CAMPBELL, *Primary Examiner.*

PAUL M. COHEN, *Assistant Examiner.*

U.S. Cl. X.R.

29—421, 470.1, 497.5